(12) United States Patent
Adenis et al.

(10) Patent No.: US 9,689,278 B2
(45) Date of Patent: Jun. 27, 2017

(54) ROTOR DISK INCLUDING A PLURALITY OF HOOKS

(71) Applicant: SNECMA, Paris (FR)

(72) Inventors: Patrick Adenis, Pontault-Combault (FR); Claude Lejars, Draveil (FR); Silvain Lormier, Nandy (FR); Sylvain Poitout, Chartrettes (FR)

(73) Assignee: SNECMA, Paris (FR)

( * ) Notice: Subject to any disclaimer, the term of this patent is extended or adjusted under 35 U.S.C. 154(b) by 582 days.

(21) Appl. No.: 14/146,484

(22) Filed: Jan. 2, 2014

(65) Prior Publication Data
US 2014/0193265 A1 Jul. 10, 2014

(30) Foreign Application Priority Data

Jan. 4, 2013 (FR) ..................... 12 50075

(51) Int. Cl.
| | | |
|---|---|---|
| *F01D 5/32* | (2006.01) | |
| *F01D 25/24* | (2006.01) | |
| *B23P 6/00* | (2006.01) | |
| *F01D 5/30* | (2006.01) | |
| *F01D 11/00* | (2006.01) | |

(52) U.S. Cl.
CPC ............ *F01D 25/243* (2013.01); *B23P 6/002* (2013.01); *F01D 5/3015* (2013.01); *F01D 5/326* (2013.01); *F01D 11/006* (2013.01); *Y10T 29/49318* (2015.01)

(58) Field of Classification Search
CPC ...... F01D 5/3015; F01D 5/326; F01D 11/005; F01D 11/006; Y10T 29/49318; B29P 6/002
See application file for complete search history.

(56) References Cited

U.S. PATENT DOCUMENTS

| | | | |
|---|---|---|---|
| 3,888,601 A * | 6/1975 | Glassburn | ............... F01D 5/027 416/144 |
| 4,221,542 A | 9/1980 | Acres et al. | |
| 4,275,990 A * | 6/1981 | Langley | .................. F01D 5/187 416/220 R |
| 5,281,098 A * | 1/1994 | Glynn | ................... F01D 5/3015 416/220 R |
| 5,435,694 A | 7/1995 | Kray et al. | |
| 6,234,756 B1 | 5/2001 | Ress, Jr. et al. | |
| 2004/0047726 A1 | 3/2004 | Morrison | |

FOREIGN PATENT DOCUMENTS

| | | |
|---|---|---|
| EP | 1 760 258 | 3/2007 |
| EP | 1 760 259 | 3/2007 |
| FR | 2 913 064 | 8/2008 |
| FR | 2 974 142 | 10/2012 |

OTHER PUBLICATIONS

Search Report and Written Opinion as issued for French Patent Application No. 1350075, dated Oct. 10, 2013.

* cited by examiner

*Primary Examiner* — Ninh H Nguyen
(74) *Attorney, Agent, or Firm* — Pillsbury Winthrop Shaw Pittman LLP (57) ABSTRACT

A rotor disk comprises a plurality of circumferentially distributed hooks, the set of hooks defining an annular groove adapted to cooperate with at least two flange sectors. At least one of the hooks comprises a second element through which a recess is formed which opens up at each of the transverse flanks of the second element and at the internal peripheral surface of the second element.

13 Claims, 6 Drawing Sheets

ROTOR DISK INCLUDING A PLURALITY OF HOOKS

This application claims priority of French patent application No. 1350075 deposited on Jan. 4 2013, the complete description of said French patent application being incorporated in this application by reference.

FIELD

The field of the invention relates to a rotor disk. One particularly interesting application of the invention is the technical field of turbomachines.

STATE OF PRIOR ART

As disclosed in document FR2974142, a turbomachine rotor comprises particularly a rotor disk and radial blades installed at the periphery of the rotor disk. Each blade comprises a root that fits into a complementary groove, commonly called a slot, made in the periphery of the rotor disk. Each slot is straight, has a constant cross-section over its entire axial length and extends through the entire thickness of the rotor disk.

It is known that a plurality of sealing flange sectors can be used to seal the blade roots in the slots. Each flange sector is installed on the rotor disk through axial hooks CA that are supported by the rotor disk (see FIG. 1). More particularly, the hooks CA are radially open towards the inside, in other words along the longitudinal axis of the rotor disk and together define an annular groove open radially inwards in which the flange sectors fit. The ends of the flange sectors are always put end to end under an axial hook CA. In other words, the ends of the flange sectors are never outside an axial hook CA.

Figure 1:
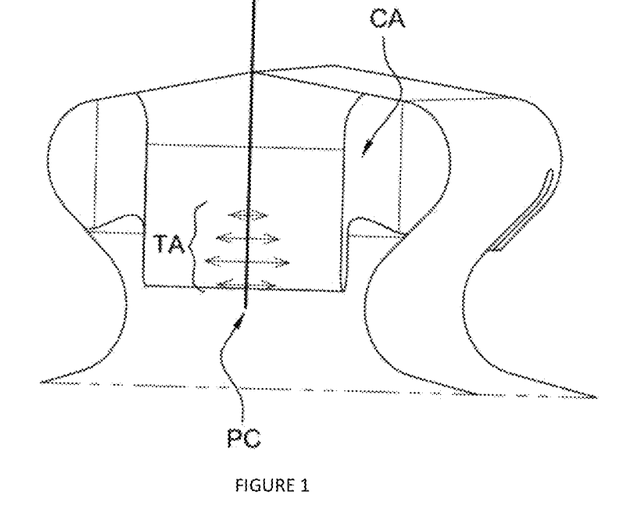
FIG. 1 diagrammatically shows a hook of a rotor disk conforming with the state of the art.

Note that when the rotor disk is accelerating, tension forces TA are generated at each of the ends of the flange sectors, the tension forces applied at the two ends facing each other being in opposite directions.

At the time of the deceleration of the rotor disk, compression forces are generated at each of the ends of the flange sectors, the compression forces applied at two ends facing each other also being in opposite directions.

Consequently, opposing forces on the hooks CA facing ends of the flange sectors, caused by expansion of the flange sectors will damage the material from which these hooks CA are made and also result in the creation of a shear plane PC. This damage and this shear plane PC generate cracks on the hook CA, and these cracks will propagate until the hook CA fails.

SUMMARY

One purpose of the invention relates to a rotor disk fitted with a plurality of circumferentially distributed hooks. Another aspect of the invention relates to a repair process for a rotor disk fitted with a plurality of circumferentially distributed hooks.

One non-limitative embodiment of the invention is aimed at overcoming the disadvantages of the state of the art. In this context, a non-limitative embodiment of the invention applies to a rotor disk fitted with a plurality of hooks with a longer life.

To achieve this, the rotor disk is fitted with a plurality of circumferentially distributed hooks, each hook having:
   a first element starting on a transverse flank of the rotor disk and extending along the longitudinal axis of the rotor disk, the transverse flank of the rotor disk being approximately perpendicular to the longitudinal axis of the rotor disk,
   a second element starting at the end of the first element, the second element extending radially in the direction of the longitudinal axis of the rotor disk,
the set of hooks defining an annular groove adapted to cooperate with at least two flange sectors, at least one of the hooks comprising a second element through which a recess is formed which opens up at each of the transverse flanks of the second element and at the internal peripheral surface of the second element, the transverse flanks of the rotor disk being approximately perpendicular to the longitudinal axis of the rotor disk.

Note that the recess is below the internal radius of curvature of the junction between first element and the second element of the hook.

Due to the presence of this recess in the second element of the hook, the characteristic phenomenon consisting of creating a shear plane that would generate the appearance of cracks at the interface between the ends of the flanges and the hook is completely or very substantially eliminated. In other words, the shear plane is modified or even eliminated such that cracks are no longer generated by the forces applied at the ends of the flange sectors.

Furthermore, the fact that the recess is below the radius of curvature avoids weakening the hook.

Apart from the main characteristics that have just been mentioned in the previous section, the rotor disk according to one embodiment of the invention may have one or several additional characteristics described below considered individually or in any technically possible combination.

In one non-limitative embodiment, the dimensions of the recess prevent the appearance of cracks during rotation of the rotor disk.

In one non-limitative embodiment, the transverse length of the recess at the internal peripheral surface of the second element is three times shorter than the transverse length of the hook, the transverse length of the recess and the transverse length of the hook being approximately perpendicular to the radius of the rotor disk.

In one non-limitative embodiment, the minimum radial height of the recess is of the order of 0.5 mm.

In one non-limitative embodiment, there is an angle between the axis of revolution of the recess and the longitudinal axis of the rotor disk.

In one non-limitative embodiment, the radial height of the recess below the internal radius of curvature is located on the transverse flank on the same side as the transverse flank of the rotor disk.

In one non-limitative embodiment, the radial height of the recess located on the opposite transverse flank is greater than the internal radius of curvature.

In one non-limitative embodiment, the recess may have a U-shaped profile, or a profile following the arc of a circle or an arc of an ellipse, in a plane transverse to the longitudinal axis.

In one non-limitative embodiment, the rotor disk is a rotor disk of a turbomachine.

Another aspect of the invention relates to a method of repairing a rotor disk comprising a plurality of circumferentially distributed hooks, each hook having:
   a first element starting on a transverse flank of the rotor disk and extending along the longitudinal axis of the rotor disk, the transverse flank of the rotor disk being approximately perpendicular to the longitudinal axis of the rotor disk, a second element starting at the end of the first element, the second element extending radially in the direction of the longitudinal axis of the rotor disk, the set of hooks defining an annular groove adapted to cooperate with at least two flange sectors.

The repair method comprises the following steps:

delimit a zone of the second element in which there are cracks, machine below the internal radius of curvature at the junction between the first element and the second element of the hook, a recess opening up at each of the transverse flanks of the second element and at the internal peripheral surface of the second element, the transverse flanks of the rotor disk being approximately perpendicular to the longitudinal axis of the rotor disk, the recess at least covering the zone such that the cracks are eliminated.

With this embodiment, the cracks and the shear plane due to expansion of the ends of the flange sectors are eliminated while maintaining optimum strength of the machined hook.

BRIEF DESCRIPTION OF THE FIGURES

Other characteristics and benefits of the invention will become clear after reading the description given below for information and in no way limitative with reference to the attached appended figures among which.

For reasons of clarity, only elements used for understanding embodiments of the invention have been shown, without respecting the scale and only diagrammatically. Furthermore, similar elements shown in different figures have identical references.

FIG. 1 has already been used to show a hook of a rotor disk conforming with the state of the art.

DETAILED DESCRIPTION

Figure 2:
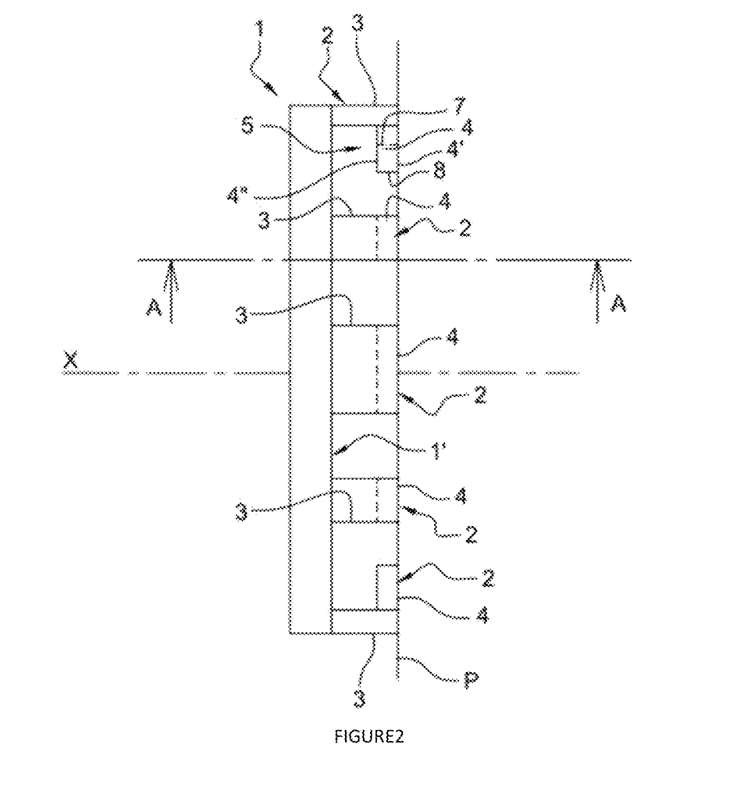
FIG. 2 diagrammatically shows an example embodiment of a rotor disk conforming with one embodiment of the invention.

FIG. 2 shows an example embodiment of a rotor disk 1 according to the invention. The rotor disk 1 is provided with a plurality of circumferentially distributed hooks 2, each hook 2 being formed by a first element 3 and a second element 4.

Each first element 3 starts on a transverse flank 1' of the rotor disk 1 and extends along the longitudinal axis X of the rotor disk 1.

Each second element 4 starts at the free end of the first element 3 (i.e. at the end of the first element 3 opposite the end of the first element 3 in contact with the transverse flank 1' of the rotor disk 1) and extends radially inwards relative to the longitudinal axis X of the rotor disk 1.

Thus, the hooks 2 define an annular groove 5 open radially inwards, in other words in the direction of the longitudinal axis X of the rotor disk 1. This annular groove 5 is adapted to cooperate with at least two flange sectors 6.

In one non-limitative embodiment, each hook 2 comprises a second element 4 through which a recess 7 passes opening up in each of the transverse flanks 4' and 4" of the second element 4 and at the inner peripheral surface 8 of the second element 4. Only one recess is shown in FIG. 2 for reasons of clarity.

Figure 3:
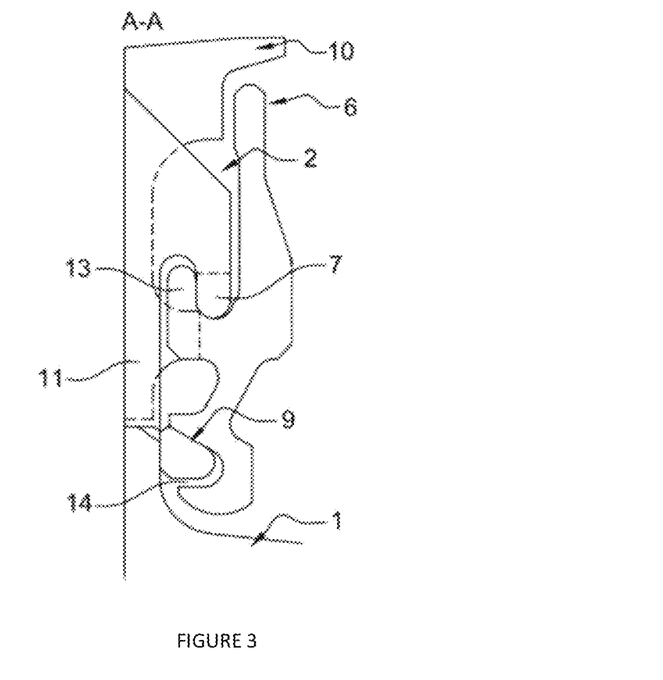
FIG. 3 diagrammatically shows a sectional view A-A of a rotor disk conforming with that shown in FIG. 1, said rotor disk also being provided with a sealing flange.

FIG. 3 shows a sectional view A-A of the rotor disk 1 shown in FIG. 2 also provided with a sealing flange 6.

Each blade 10 of a rotor disk 1 comprises a root 11 that fits into a complementary groove (also called slot), formed in the periphery of the rotor disk 1. The flanges 6 are installed on the rotor disk 1 through axial hooks 2 that are supported by the rotor disk 1, to seal the blade roots 11 in the slots.

Figure 4:
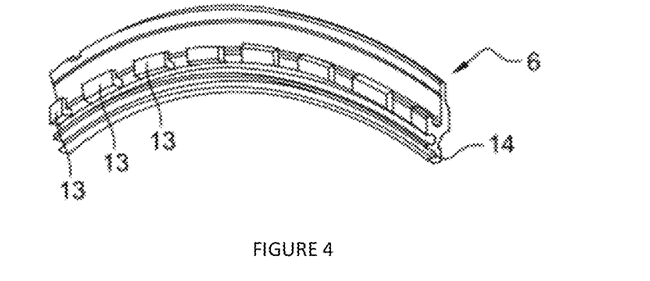
FIG. 4 diagrammatically shows an flange sector.

As shown in FIG. 4, an flange sector 6 comprises a plurality of hooks 13 adapted to cooperate with the hooks 2 of the rotor disk 1. Each flange sector 6 also comprises a groove 14 adapted to hold a sealing ring 9.

Thus, each flange sector 6 seals the blade roots 11. This sealing is done by the hooks 2 of the rotor disk 1 cooperating with the hooks 13 of the flange sector 6 and by the sealing ring 9 that is fitted on the flange sector 6.

Each hook 2 of the rotor disk 1 holds at least part of the sealing flange 6.

Figure 5:
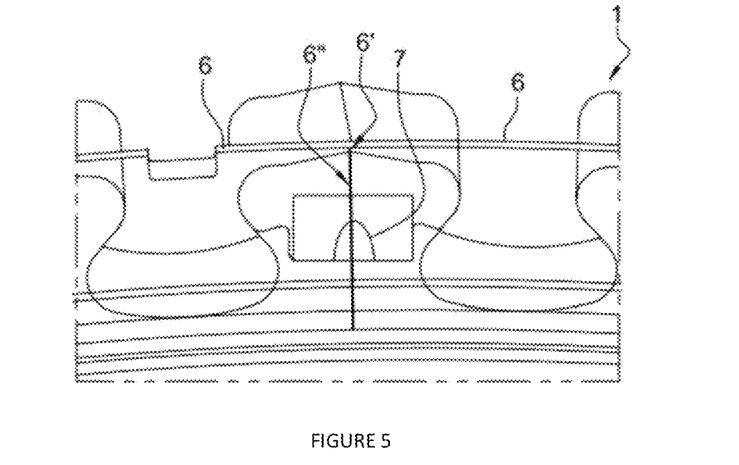
FIG. 5 diagrammatically shows a hook of a rotor disk conforming with one embodiment of the invention cooperating with two ends of the flange sectors, each end belonging to a different flange.

As shown in FIG. 5 in which the rotor disk 1 is displayed transparently (i.e. through two sectors of the sealing flange 6), a first end 6' of an flange sector 6 is necessarily facing a second end 6" of another flange sector 6. The two ends 6' and 6" join together at the recess 7 of a hook 2. In other words, the junction of two flange sectors 6 is located facing the recess 7 such that the physical contact between the ends 6' and 6" of the flange sectors 6 and the hook 2 of the rotor disk 1 is limited. Consequently, expansion of the ends 6' and 6" of the flange sectors 6 has no incidence on the hook 2 of the rotor disk 1. As a result, there is no shear plane and consequently no cracks are created.

Note that the recess 7 has a profile that prevents the appearance of cracks during rotation of the rotor disk 1. Thus, different dimensions and/or shapes of recess 7 (also called lunula) may be made.

The recess 7 is below the internal radius of curvature R of the junction between the first element 3 and the second element 4, to avoid weakening the hook 2 of the rotor disk.

Figure 6A:
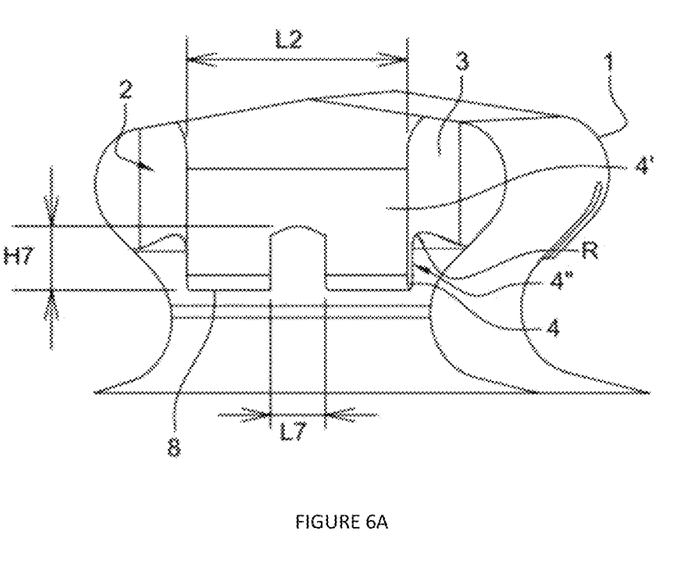
FIG. 6A diagrammatically shows a hook of a rotor disk conforming with one embodiment of the invention provided with a recess with a U-shaped profile.
Figure 6B:
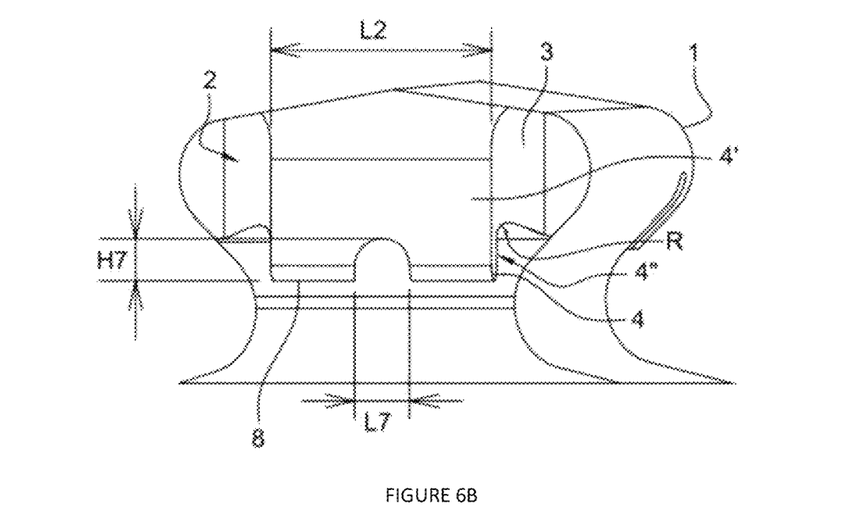
FIG. 6B diagrammatically shows a hook of a rotor disk conforming with one embodiment of the invention provided with a recess with an arc of a circle shaped profile.
Figure 6C:
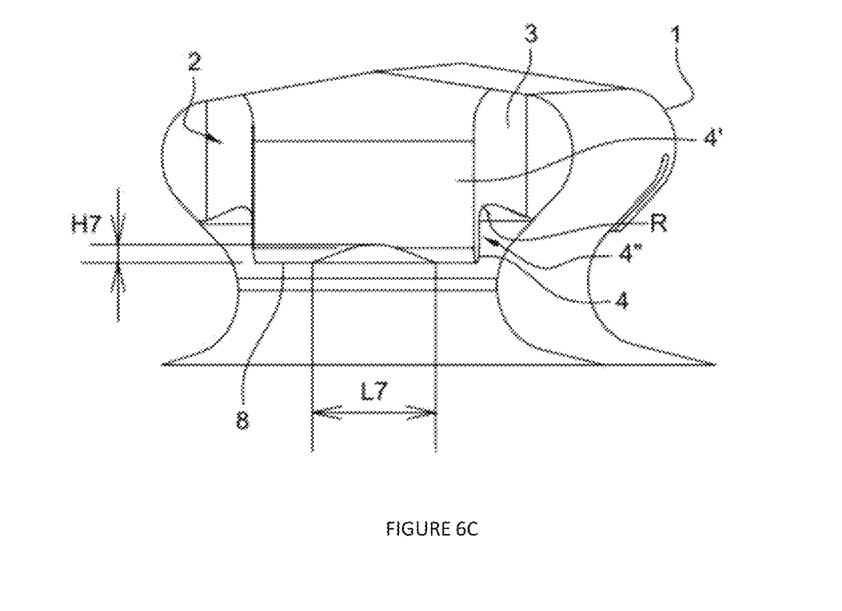
FIG. 6C diagrammatically shows a hook of a rotor disk conforming with one embodiment of the invention provided with a recess with an ellipse arc shaped profile.

Non-limitatively, the recess 7 may have the following in a plane P transverse to the longitudinal axis X, a U-section (see FIG. 6A), an arc of a circle-shaped profile (see FIG. 6B), or an arc of ellipse-shaped profile (see FIG. 6C).

Furthermore, the dimensions of the recess 7 are chosen such that:

the height H7 of the recess 7 is less than the maximum allowable height in terms of stress concentration and life of the hook 2, the phenomenon that causes the generation of cracks is eliminated, and the seal is maintained.

Therefore, the objective is to achieve a compromise between these different parameters to find the best profile for the recess 7.

In one non-limitative embodiment example, when the recess 7 has an axis of revolution A7 approximately parallel to the longitudinal axis X (see FIG. 2), the recess 7 may have a minimum radial height H7 of the order of 0.5 mm. This height H7 may for example be between 0.5 and 2.05 mm, and is less than the internal radius of curvature R at the junction between the first element 3 and the second element 4.

In such an example, it is desirable for the base of the recess 7 (in other words, the length of the recess at the internal peripheral surface 8 of the second element 4) to have a minimum transverse length L7 of the order of 2.5 mm, to eliminate all shear planes that could generate cracks.

In the case of a turbomachine rotor disk 1, for a hook with a transverse length L2 of 11 mm (in other words the length of the second element 4 located on the internal peripheral surface 8), the recess 7 may non-limitatively have a minimum transverse length L7 of the order of 3 mm such that no shear plane is present.

In another example, the disk diameters on downstream compressor stages are smaller and this transverse length L7 equal to 3 mm may be too large. In this case, the transverse length L7 must be less than 3 mm.

Conversely, disk diameters on upstream compressor stages are higher and this transverse length L7 equal to 3 mm may be too small to eliminate the shear plane. In this case, the transverse length L7 must be more than 3 mm.

In general, the transverse length L7 of the recess 7 is approximately three times less than the transverse length L2 of the hook 2 of the rotor disk 1.

Figure 7:
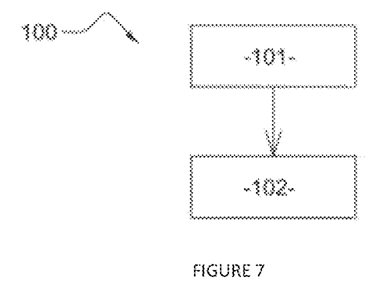
FIG. 7 diagrammatically shows a method of repairing a rotor disk provided with a plurality of hooks.

One aspect of the invention also applies to a method 100 for repairing a rotor disk 1 comprising a plurality of circumferentially distributed hooks 2, each hook 2 having:

a first element 3 starting on a transverse flank 1' of the rotor disk 1 and extending along a longitudinal axis X of the rotor disk 1, and a second element 4 starting at the end of the first element 3, the second element 4 extending radially inwards from the longitudinal axis X of the rotor disk 1.

The set of hooks 2 defines an annular groove 5 adapted to cooperate with at least two flange sectors 6.

Figure 8:
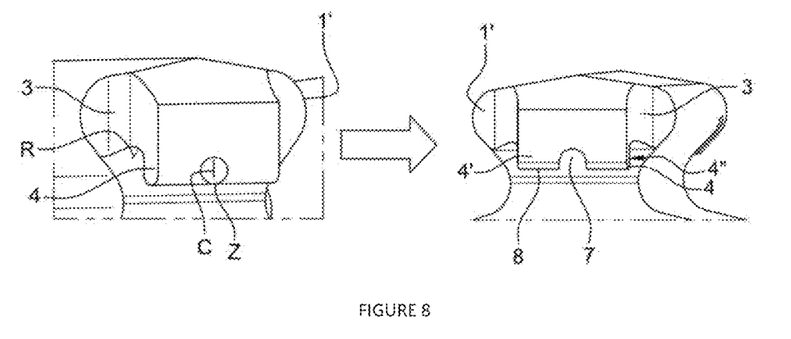
FIG. 8 also shows an example embodiment of steps in the method according to the invention shown in FIG. 7.

The repair method 100 according to one embodiment of the invention comprises the following steps:

delimit 101 a zone Z of one of the second elements 4 in which there are cracks C, machine 102 a recess 7 opening up at each of the transverse flanks 4' and 4" of the second element 4 and at the internal peripheral surface 8 of the second element 4, the recess 7 covering at least the zone Z so that the cracks C are eliminated.

The zone Z comprising cracks may be detected through a pressurisation check.

When the rotor disk 1 is installed on a turbomachine, the hooks 2 are difficult to access such that the cracks C are only detectable when they have a minimum depth. Some hooks 2 can thus have damaging but undetectable cracks C that must therefore be eliminated. To delimit the zone Z, the objective is to create a compromise between the largest recess 7 that can eliminate as many cracks as possible and a more limited recess to avoid reducing the life of the hook 2 by weakening it.

Machining 101 of the recess 7 eliminates all cracks, even undetectable cracks. Furthermore, this solution prevents the appearance of subsequent cracks because the shear plane that would generate cracks C is eliminated.

The recess 7 is conforming with at least one of the previous embodiments. In other words, the recess 7 may have a profile following the arc of an ellipse, a U-shaped profile or a profile following the arc of a circle, in a plane P transverse to the longitudinal axis X.

The recess 7 is bellow the internal radius of curvature R at the junction between the first element 3 and the second element 4, to avoid weakening the hook 2 of the rotor disk.

Furthermore, the dimensions of the recess 7 are chosen such that:

the height H7 of the recess 7 is less than the maximum acceptable height in terms of stress concentration and the life of the hook 2, the phenomenon generating cracks is eliminated, and the seal is preserved.

Therefore, the objective is to produce a compromise of these various parameters to find the best profile of the recess 7.

In general, the transverse length L7 of the recess 7 is approximately three times smaller than the transverse width L2 of the hook 2 of the rotor disk 1.

Figure 9:
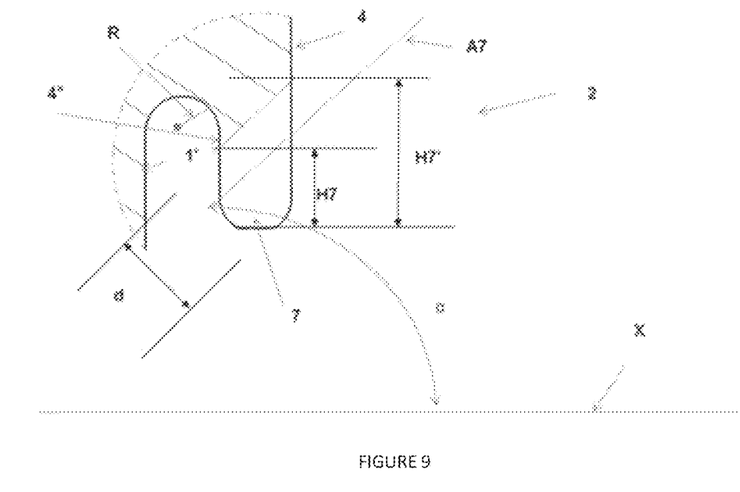
FIG. 9 shows a sectional view of another example hook that is fitted on a rotor disk 1 conforming with an embodiment of the invention.

FIG. 9 is a sectional view of another example hook 2 that is fitted on a rotor disk 1 conforming with one embodiment of the invention.

In the same way as for the previous embodiments, it should be noted that the recess 7 opening up at each of the transverse flanks 4', 4" and at the internal peripheral surface 8 of the second element 4 forming part of the hook 2 has an axis of revolution A7 forming an angle α with the longitudinal axis X of the rotor disk 1 of the order of 45 degrees. This angle α is in no way limited to 45 degrees and may be between 30 and 60 degrees.

The height of the recess on the upstream side H7, in other words the side of the transverse flank 1' of the rotor disk 1, is less than the internal radius of curvature R at the junction between the first element 3 and the second element 4. This limited height H7 of the recess 7 on the upstream side avoids weakening the hook 2.

In this non-limitative embodiment, the height H7 is less than the internal radius of curvature R and the height of the recess on the downstream side H7' is more than the internal radius of curvature R of the recess 7. The result is that the axis of revolution A7 of the recess 7 is inclined from the longitudinal axis X of the rotor disk 1. This inclination makes it easier to machine the recess 7 on a hook 2 when the rotor disk 1 is already installed in a turbomachine. Once installed, access to the rotor disk 1 is restricted.

Non-limitatively, the recess 7 is machined using a bit with a diameter of 2.33 mm. In one non-limitative embodiment, the height H7 of the recess 7 is of the order of 1.5 mm, and the height H7' is of the order of 3.3 mm.

Figure 10:
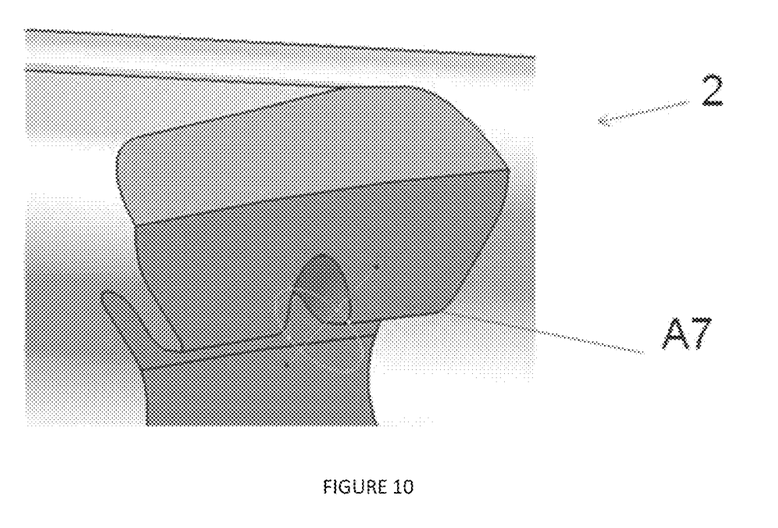
FIG. 10 shows a perspective view of a hook with a recess, the axis of revolution of which is inclined.

FIG. 10 shows a perspective view of a hook 2 with a recess for which the axis of revolution A7 is inclined.

The invention was described in the above with a hook with a recess centred at the centre of the transverse length L2 of said hook 2. Obviously, the shapes, the arrangement and/or the design of this recess may be modified without going outside the scope of the invention.

Furthermore, the set of hooks of the rotor disk or only some hooks of the rotor disk may be provided with a recess.

In particular, a recess may be provided only for the hooks facing the two ends of the flange sector.

The invention claimed is:

1. Rotor disk fitted with a plurality of circumferentially distributed hooks, each hook having:
   a first element starting on a transverse flank of said rotor disk and extending along the longitudinal axis of said rotor disk,
   a second element starting at the end of said first element, said second element extending radially in the direction of the longitudinal axis of said rotor disk, said second element including transverse flanks,
   in which the set of hooks define an annular groove adapted to cooperate with at least two flange sectors, at least one of said hooks comprising a second element through which a recess is formed which opens up at each of the transverse flanks of said second element and at the internal peripheral surface of said second element, and in which the recess is below the internal radius of curvature of the junction between the first element and the second element of the hook.

2. Rotor disk according to claim 1, in which the dimensions of the recess prevent the appearance of cracks during rotation of the rotor disk.

3. Rotor disk according to claim 1, in which the transverse length of the recess at the internal peripheral surface of the second element is three times shorter than the transverse length of the hook, the transverse length of the recess and the transverse length of the hook being approximately perpendicular to the radius of the rotor disk.

4. Rotor disk according to claim 1, in which the minimum radial height of said recess is of the order of 0.5 mm.

5. Rotor disk according to claim 1, in which there is an angle between the axis of revolution of said recess and the longitudinal axis of the rotor disk.

6. Rotor disk according to claim 5, in which the radial height of the recess below the internal radius of curvature is located on the transverse flank on the same side as the transverse flank of the rotor disk.

7. Rotor disk according to claim 6, in which the radial height of the recess located on the opposite transverse flank is greater than the internal radius of curvature.

8. Rotor disk according to claim 1, in which the recess has a U-shaped profile in a plane transverse to the longitudinal axis.

9. Rotor disk according to claim 1, in which the recess has a profile following the arc of a circle, in a plane transverse to the longitudinal axis.

10. Rotor disk according to claim 1, in which the recess has a profile following an arc of an ellipse, in a plane transverse to the longitudinal axis.

11. Rotor disk according to claim 1, in which said rotor disk is a rotor disk of a turbomachine.

12. Rotor disk according to claim 1, wherein one of the transverse flanks of said second element, which the recess opens up at, faces the transverse flank of said rotor disk.

13. Method of repairing a rotor disk comprising a plurality of circumferentially distributed hooks, each hook having:
   a first element starting on a transverse flank of said rotor disk and extending along the longitudinal axis of said rotor disk,
   a second element starting at the end of said first element, said second element extending radially in the direction of the longitudinal axis of the rotor disk,
the set of hooks defining an annular groove adapted to cooperate with at least two flange sectors, said repair method comprising:
   delimiting a zone of the second element of a hook in which there are cracks,
   machining below the internal radius of curvature at the junction between the first element and the second element of the hook, a recess opening up at each of the transverse flanks of the second element and at the internal peripheral surface of the second element,
the recess at least covering said zone such that the cracks are eliminated.

* * * * *

UNITED STATES PATENT AND TRADEMARK OFFICE
CERTIFICATE OF CORRECTION

PATENT NO. : 9,689,278 B2
APPLICATION NO. : 14/146484
DATED : June 27, 2017
INVENTOR(S) : Patrick Adenis et al.

It is certified that error appears in the above-identified patent and that said Letters Patent is hereby corrected as shown below:

On the Title Page

Item (30) Foreign Application Priority Data:
Please correct the French Priority Application Number as follows:
Jan. 4, 2013    (FR).......................1350075

Signed and Sealed this
Eighth Day of August, 2017

Joseph Matal
*Performing the Functions and Duties of the
Under Secretary of Commerce for Intellectual Property and
Director of the United States Patent and Trademark Office*